June 14, 1960 L. EDWARDS 2,940,766
STEERABLE FRONT END SUSPENSION FOR TRAILERS AND WAGONS
Filed July 21, 1958
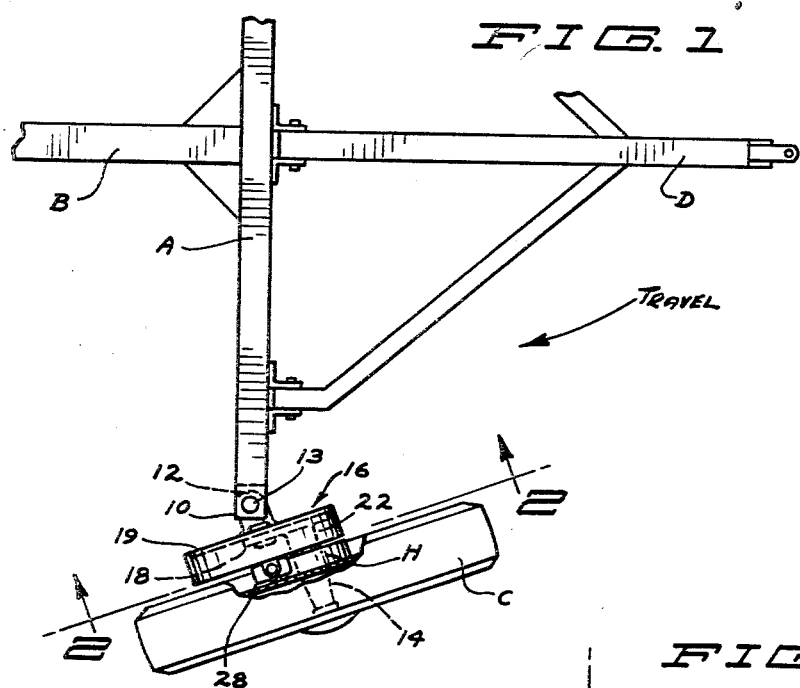
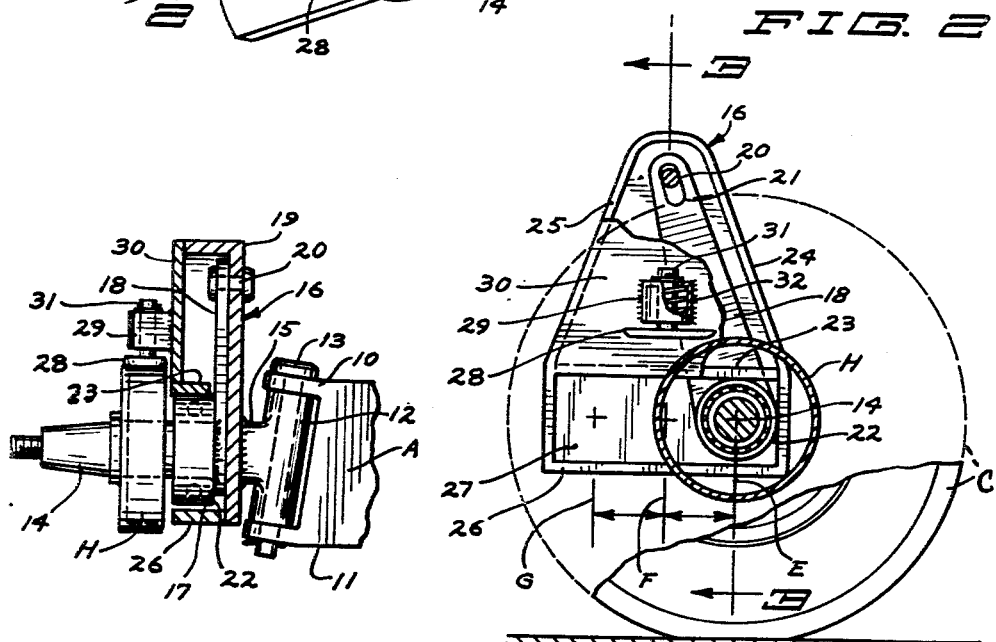
INVENTOR.
LUVERNE EDWARDS, Deceased
BY MABEL R. EDWARDS, ADMINISTRATRIX
BY Carlsen & Hogle
ATTORNEYS United States Patent Office 2,940,766
Patented June 14, 1960

2,940,766

STEERABLE FRONT END SUSPENSION FOR TRAILERS AND WAGONS

Luverne Edwards, deceased, late of Minneapolis, Minn., by Mabel R. Edwards, administratrix, Minneapolis, Minn., assignor of twenty percent to James E. Main, Minneapolis, Minn.

Filed July 21, 1958, Ser. No. 749,794

3 Claims. (Cl. 280—29)

This invention relates generally to vehicle wheel suspensions, particularly to front wheel suspensions for pull-behind vehicles such as trailers, wagons and the like. Such vehicles, usually attached by a hitch to an automobile or tractor, are widely used for many purposes and while they offer no particular problem as to guidance and maneuverability when traveling forwardly they are difficult to back up in close quarters or accurately into any confined space such as a driveway, alongside a loading dock and so on to anyone who does not have the knack and skill required. This aggravating difficulty in the operation of trailer and tractive vehicle combinations is too well known to require further elaboration herein.

According to the present invention and as its primary object the front wheels of the trailing vehicle, be it wagon, trailer or whatever, are individually mounted for swingable or dirigible movements about generally upright axes with respect to the frame of the vehicle, and the journals or spindles upon which the front wheels revolve are operatively arranged for movements from positions behind the plane of such generally upright axes to positions forwardly thereof, according to the direction of travel of the vehicle. In other words, when the vehicle travels forwardly then the front wheel spindles, as they will be hereinafter called for convenience sake, will be located to the rear of the generally upright axes about which the wheels swing but when the vehicle is backed up these spindles will move to their forward positions. Thus in either rearward or forward positions of the spindles the front wheels will tend to self-steer or caster and while this action may be of no great moment when traveling forwardly it will be of great benefit in maneuvering and properly steering the vehicle when it is backed up, actual experience proving that even in the hands of a relatively inexperience operator driving the pulling vehicle the trailing vehicle may be very easily and accurately handled and moved in any desired direction when backing up.

Another object is to provide a wheel suspension and mounting of the foregoing characteristics which is relatively simple and inexpensive, strong, readily applied to the wagon or trailer frame and which functions entirely automatically as the direction of travel of the vehicle is changed, with no tendency to merely oscillate from one position to another as travel speeds vary and thereby cause undue wear on the moving parts.

These and other more detailed and specific objects will be disclosed in the course of the following specification, reference being had to the accompanying drawings, in which—

Fig. 1 is a partial plan view of the fore corner of a trailer-type vehicle equipped with the wheel suspension of the present invention, one front wheel only being shown and illustrated in one position assumed when backing up the vehicle.

Fig. 2 is an enlarged longitudinal and vertical sectional view substantially along the line 2—2 in Fig. 1, the wheel itself being partially shown in full lines and in dotted lines in its forward position.

Fig. 3 is a detail and fragmentary sectional view substantially along the line 3—3 in Fig. 2, the wheel itself being omitted.

Referring now more particularly and by reference characters to the drawing the right fore corner of the frame of a trailer type of vehicle appears in Fig. 1 and the same is seen to comprise a front axle A to which is rigidly secured a rearwardly extending center or backbone structure B extending to the rear wheels (not here shown). The right front wheel is designated at C and it will be understood that another similar wheel will be located at the opposite, left hand end of the axle A, but since the structures involved are duplicates except for right and left hand characteristics there is no necessity seen for disclosing both herein. Attachment to the towing vehicle, whether it be an automobile or tractor, is made from the front axle A by means of a draft tongue D attached and braced in any suitable manner to the axle for applying tractive forces to the trailer in order to move it either forwardly or rearwardly according to the direction of travel of the towing vehicle.

In accordance with this invention the ends of the axle A are provided with upper and lower apertured hinge lugs 10 and 11, as seen in Fig. 3, for the accommodation therebetween of a tubular steering knuckle 12 pivotally mounted by means of a pin 13 so that the associated wheel C may swing about a generally upright axis and thereby control the direction of travel of the trailer vehicle as will later appear. The wheel C is conventionally mounted upon a spindle 14 for rotation about the generally horizontal axis thereof and in the ordinary instance said spindle 14 would be a rigid continuation outward from the steering knuckle 12. In the present case, however, and further in accordance with the invention, the steering knuckle 12 is rigidly welded at 15 or otherwise secured to an upright wheel mounting member 16 whereas the spindle 14 is rigidly affixed, as designated at 17, to the lower end of a forwardly-rearwardly swingable lever 18. The said mounting member 16 includes an inner heavy wall 19 and the lever 18 is arranged for swinging motion across the outer face of this wall 19 with the lever pivoting about a pivot pin 20 secured to the wall 19 near the upper extremity thereof. The upper end of the lever 18 is provided with an elongated slot 21 for the reception of the pin 20 for the reason that the spindle 14 extending outward from the lower end of the lever is fitted with an anti-friction bearing or roller 22 on its lower end which bears upwardly upon a forwardly and rearwardly extending straight support bar 23 which is carried by marginal flanges 24 and 25 extending outwardly from the aforesaid wall 19. Said flanges 24–25 diverge in a downward direction and extend some distance below the support bar 23 with their lower ends joined by a lower bar 26 so that in effect a horizontal, straight and generally forwardly and rearwardly extending channel or track 27 is provided for the accommodation of the bearing roller 22 upon the inner end of the spindle 14. It is due to the fact that this track 27 is straight that the slot 21 is necessary in order to provide for the slight upward and downward motion of the lever 18 as the spindle 14 moves from front to rear of the track as will also presently appear, and it will be noted that the rolling contact between the bearing or roller 22 and the support bar 23 will transmit the load of the vehicle to the wheel spindle 14 independently of the pivot mounting of the lever 18. It is also to be noted that since the support bar 23 is horizontally extended the spindle 14 and its associated wheel C may move from front to rear of the track 27 without tending to lift the load as represented by the trailer and its contents which would, of course, interfere with the free operation of the wheel suspension, as would also the transmission of load forces through the lever 18 instead of through the bearing 22 as just stated.

The foregoing arrangement is such that, as designated by the lines E, F and G in Fig. 2, the axis of the spindle 14, about which the wheel C rotates, may move to either the forward position E or the rearward position G with respect to the plane of the line F which represents the axis of the pin 13 about which the entire wheel assembly may swing with respect to the frame of the trailer. The effect of this motion, which is brought about solely by the resistance of the wheel C in contact with its supporting surface as the direction of travel of the vehicle is changed, places the axis of rotation of the wheel either forwardly or rearwardly of the dirigible axis of the wheel mounting as represented by the line F so that the wheel will have a tendency to self-steer, or caster as it is commonly called.

Without some means to prevent it the wheel might very well oscillate or hunt in forward and rearward directions with reference to the axis represented by the line F, as for example during variations in the speed of travel of the vehicle, and this action would introduce wholly unwanted and unwarranted wear upon the parts. For this purpose the wheel C is provided with the ordinary brake drum, designated at H, which constitutes an annulus or annular member concentric with the spindle 14 arranged to rotate with the wheel about the axis of the spindle 14 to present an annular wall which must, as the spindle 14 moves from either position E or G to the other, roll beneath and lift a restraining shoe 28 which is arranged for upward and downward movements in an apertured lug 29 secured to a face plate 30, welded or otherwise fastened to the aforesaid flanges 24-25. For this purpose the shoe 28 has a shank 31 movable upwardly and downwardly through the lug 29, but a coil spring 32 (appearing in Fig. 2) normally biases the shoe 28 to its lowermost position from which it must be lifted each time the annular wall of the brake drum H passes in the movement of the wheel spindle from its forwardmost and rearmost positions. Thus any hunting tendencies of the wheel between said positions or unwanted movements are completely counteracted as should be apparent.

From the foregoing it will be apparent that a vehicle suspension has been provided in which the axis of rotation of one or more wheels may move from behind to in front (or vice versa) of the plane of the axis about which the wheel mount as a whole swings or steers, merely in response to the reversal of the direction of travel of the vehicle and so that the wheel or wheels will self-steer or caster in such fashion as to greatly facilitate the maneuvering of the vehicle. While this may be described as a caster mounting for a wheel it is to be noted that the conventional bent axle usually associated with wheels of such type is not used, the wheel need not swing sidewise and reverse itself when the direction of travel is changed and thus the suspension is practical for high speed operations and for heavy loads.

It is understood that suitable changes may be made in the invention as herein shown and described, provided such changes fall within the scope of the appended claims.

What is claimed is:

1. For a vehicle having a frame, a wheel suspension comprising a wheel mounting member, means pivoting said mounting member on a generally upright axis to said frame, a lever swingable on said mounting member, a wheel spindle connected to said lever, a wheel journaled on said spindle for rotation about a substantially horizontal axis extending transversely with respect to the direction of travel of the wheel, means for transferring load forces from the mounting member to the wheel spindle independently of said lever, said last mentioned means including a bearing member on the spindle and a cooperating bearing surface on the mounting member guiding the spindle and wheel for straightline horizontal movements from a position forwardly of the said upright axis to a position rearwardly thereof as the direction of travel of the vehicle is reversed, and means movable with respect to the axis of the wheel for yieldably restraining the said spindle and wheel movements in both forward and rearward directions.

2. For a vehicle having a frame, a wheel suspension comprising a wheel mounting member, means pivoting said mounting member on a generally upright axis to said frame, a lever swingable on said mounting member, a wheel spindle connected to said lever, a wheel journaled on said spindle for rotation about a substantially horizontal axis, means for transferring load forces from the mounting member to the wheel spindle independently of said lever, said last mentioned means including a bearing member on the spindle and a cooperating bearing surface on the mounting member above said bearing member for guiding the spindle and wheel in straightline horizontal movements from a position forwardly of the said upright axis to a position rearwardly thereof as the direction of travel of the vehicle is reversed, means for yieldably restraining the said spindle and wheel movements in both forward and rearward directions, said last mentioned means including an annular member rotating with the wheel, and a downwardly spring biased shoe carried by the mounting member and lying in the path of the upper part of said annular member whereby the same must engage, lift and roll past said shoe as the wheel and spindle move forwardly and rearwardly to said positions.

3. For a vehicle having a frame, a wheel suspension comprising a wheel mounting member, means pivoting said mounting member on a generally upright axis to said frame, a lever swingable on said mounting member, a wheel spindle operatively associated with said lever and means including a cooperating bearing member and bearing surface on the spindle and mounting for guiding the spindle in straightline horizontal movements from a position forwardly of the said upright axis to a position rearwardly thereof as the direction of travel of the vehicle is reversed, a wheel journaled on the spindle, means for yieldably restraining the said spindle and wheel movements in both forward and rearward directions, said last mentioned means including an annular member rotating with the wheel, and a spring biased shoe carried by the mounting member and lying in the path of a part of said annular member whereby the same must engage, move and roll past said shoe as the wheel and spindle move forwardly and rearwardly to said positions.

References Cited in the file of this patent

UNITED STATES PATENTS

| | | |
|---|---|---|
| 1,343,758 | Austin | June 15, 1920 |
| 1,839,396 | Kimball | Jan. 5, 1932 |

FOREIGN PATENTS

| | | |
|---|---|---|
| 469,888 | France | May 30, 1914 |